Sept. 10, 1963     D. ROSE     3,103,339
FLUID PRESSURE ACTUATOR FOR VALVE
Original Filed Jan. 6, 1959     6 Sheets-Sheet 1

INVENTOR
DONALD ROSE
BY
ATTORNEY

INVENTOR
DONALD ROSE

Sept. 10, 1963 D. ROSE 3,103,339
FLUID PRESSURE ACTUATOR FOR VALVE
Original Filed Jan. 6, 1959 6 Sheets-Sheet 4

INVENTOR
DONALD ROSE
BY Beale and Jones
ATTORNEY

United States Patent Office 3,103,339
Patented Sept. 10, 1963

3,103,339
FLUID PRESSURE ACTUATOR FOR VALVE
Donald Rose, Dayton, Ohio, assignor of one-half to Ronald D. Baker, Dayton, Ohio
Original application Jan. 6, 1959, Ser. No. 785,237, now Patent No. 3,014,497, dated Dec. 26, 1961. Divided and this application Mar. 29, 1961, Ser. No. 103,226
6 Claims. (Cl. 251—61)

This invention relates to an improved fluid pressure actuator for valves.

This invention is a continuation-in-part of my copending application Serial No. 707,267, filed January 6, 1958 now Patent No. 3,044,626 and a division of my copending application, Serial No. 785,237, filed January 6, 1959, now U.S. Patent 3,014,497, issued December 26, 1961.

An object of the invention is to provide a gasket and integral pressure actuator portions formed therein with built-in biasing portions that may be used in a valve assembly.

Another object of my invention is to provide in a pressure actuated reciprocating double acting valve a structural arrangement which results in no differential pressure and wherein positive pressure is applied in either direction of operation.

A further object of the invention is to provide a pressure actuator for a reciprocating valve wherein the actuator is free from binding and frictional forces are minimized.

A still further object of the invention is to provide for a pressure actuator for a reciprocating valve that has eliminated leakage yet is free to seat and unseat the valves operated thereby with a minimum of friction.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention, reference can be had to the following detailed description, taken together with the accompanying drawings, in which.

Throughout the description like reference numerals refer to similar or like parts.

Figure 2:
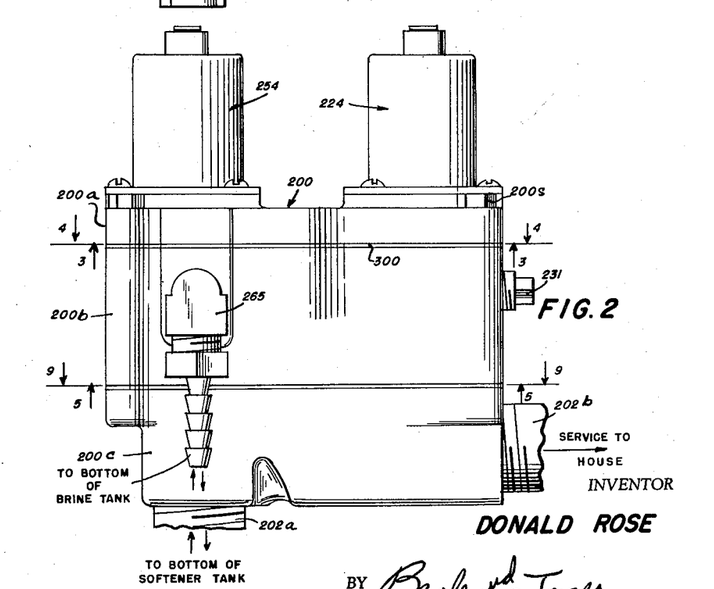
FIG. 2 is a front elevation of the valve assembly of FIG. 1.

The valve body or assembly generaly indicated at 200 is made up of three sections as shown in FIG. 2, namely, a top section 200a, a middle section 200b, and a bottom section 200c, having suitable gaskets as will be explained hereinafter between sections that are held together by four cap screws 200s at each corner received in through apertures in the sections and threadedly received in threaded apertures in the bottom section 200c. The gasket 300 between sections 200a and 200b is made up to serve at least a triple function of a gasket having portions which serve as a diaphragm valve actuator having a particular configuration to provide for biasing action, the structure of which is described in greater detail hereinafter, particularly as respects FIGS. 7 and 8.

In the make up of this valve assembly three sections are here illustrated and certain passageways are made up of complementary sections in cooperating adjacent sections which assist in the ease of manufacture, assembly and repair.

Figures 6, 7:
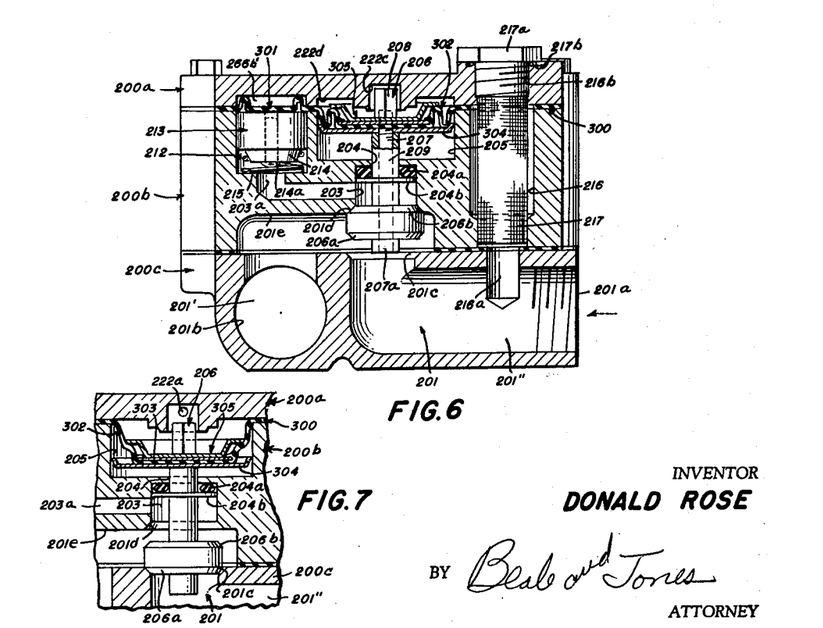
FIG. 6 is a vertical sectional view along line 6—6 of FIG. 1 showing particularly the unitary gasket and reciprocating valve actuator diaphragm.
FIG. 7 is a fragmentary of the larger diaphragm and actuator for the double acting reciprocating valve of FIG. 6 in the down position of the diaphragm and the valve actuated thereby.
Figure 11:
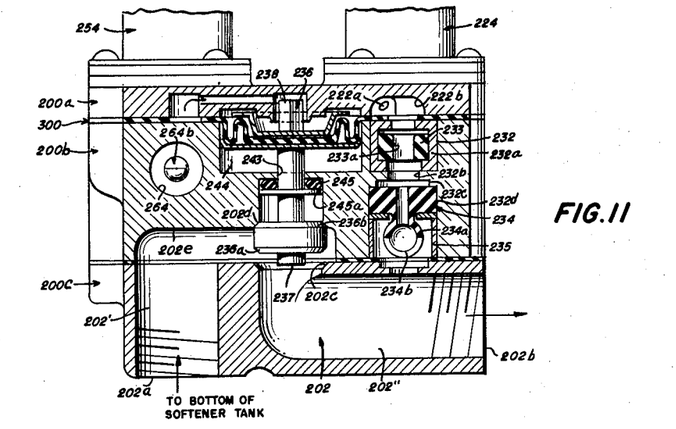
FIG. 11 is a vertical cross sectional view along line 11—11 of FIG. 1 showing the service line and certain valves therein.

Reference to FIG. 6 shows a hard water supply passageway generally indicated at 201 having an inlet end 201a, an outlet end 201b, both in the bottom sections 200c. In FIG. 11 at the other side of the valve assembly is a service passageway generally indicated at 202 through which in service condition of the valve assembly, water that has been treated to soften it passes to the house service connection 202b as will later be described. The passageway 201 in FIG. 6 is offset transversely in the bottom section 200c to form a valve seat 201c which divides the whole passageway into a first portion 201' including the cavity 201e in the bottom of middle section between the valve seat and the outlet 201b and the second portion 201" between the inlet 201a and the valve seat 201c. Also in this passageway 201 that extends in the bottom of the middle section 200b of the valve body is a valve seat 201d leading to a drain passageway 203 as will be described.

The valve seats 201c and 201d are in vertical alignment and on the vertical axis therethrough in the middle section 200b there is from bottom to top, the valve seat 201d, a first valve element drain cavity 203, a reduced bore 204 for receiving a first valve element 206 as will be described, and a first valve element pressure actuator chamber 205.

The first valve element generally indicated at 206 has a valve stem or bolt 207 having an integral head 207a at the lower end, an attached circular plate or washer 207b spaced in from 207a and a threaded upper end to receive a nut 208. About the lower end of rod 207 and about plate 207b is formed in a vulcanized manner a valve means 206a at the bottom to cooperate with valve seat 201c, a second valve means 206b thereabove to cooperate with valve seat 201c, a sleeve 209 of stainless steel is received over rod 207 and extends up through the bore 204 and through an O-ring seal 204a held by a washer 204b. The sleeve 209 seats against the bottom of a specially shaped lower disc or washer 304 as the bolt 207 passes up therethrough a pressure actuator portion 302 of combined gasket 300 receiving thereover a specially shaped top disc or washer 305 secured under nut 208.

Figures 8, 8A, 8B:
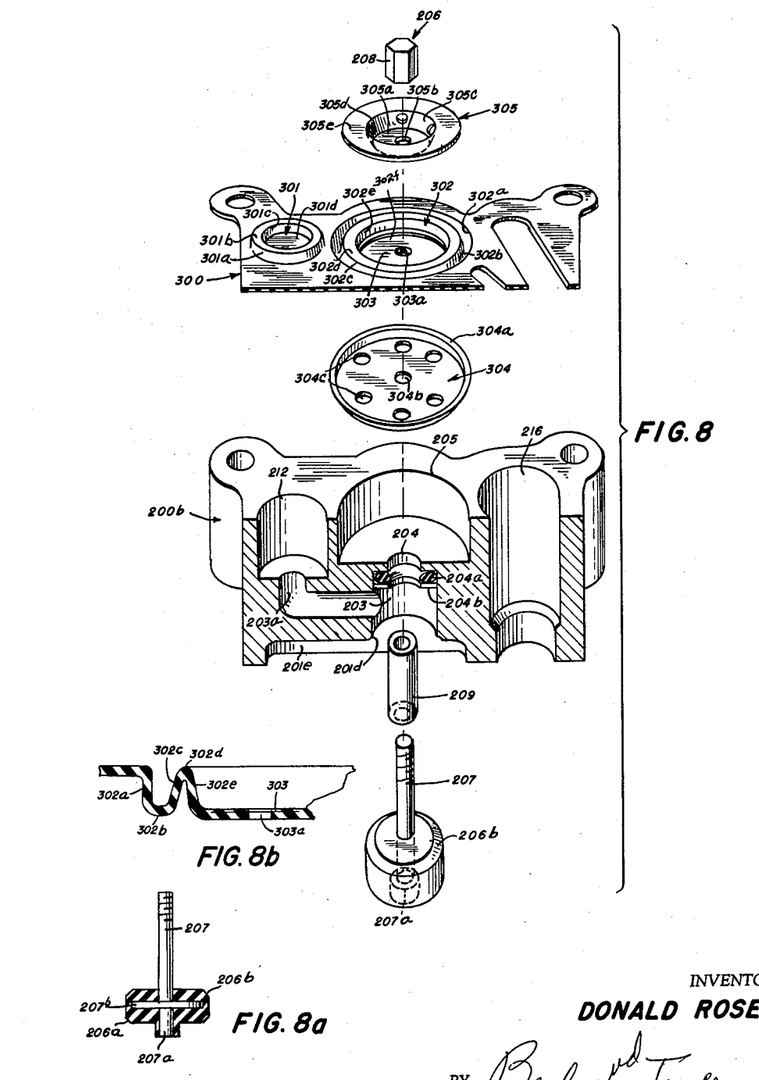
FIG. 8 is an exploded isometric view of the rear half of the mid-section and the unitary gasket and reciprocating valve actuator diaphragm together with the parts of the larger rear reciprocating valve.
FIG. 8a is a side elevation of the valve pin with the composition valve means shown in cross section.
FIG. 8b is an enlarged fragmentary view of part of the valve actuator shown in FIG. 8.

The specially shaped lower washer or piston 304 is of brass material circular in shape with an upturned rim 304a, a central aperture 304b and a plurality of circumferentially spaced apart apertures 304c to act as drains so that no water will become trapped.

The pressure actuator portion of combined gasket 300 is indicated generally at 302 which is molded with a fold part to provide for flexing up and down and to impart a biasing action to return the portion to its normal up position of rest. The pressure actuator portion 302 of the combined gasket and pressure actuator 300 is made up of a cylindrical vertical outer wall 302a, a bottom annular portion 302b extending inwardly towards a central aperture 302e, a vertically extending middle cylindrical wall 303a, spaced inwardly and concentric with wall 302a, a top annular portion 302d, an inner vertically extending cylindrical wall 302e joining at its bottom with a bottom 302f that is disc shaped and being molded about a central disc or washer 303 to afford rigidity to the bottom 302f. The portions 302a, 302b and 302c form an outer U-shaped in cross section portion with an open top while the common wall 302c and the portion 302d and vertical wall 302e form an inner inverted U-shape in cross section portion with an open bottom. These two U-shaped portions flex as shown in partially distended position in FIG. 7 and have inherent springiness to bias the pressure actuator back to its normal position when fluid actuating pressure applied to the top is removed.

The upper specially shaped washer 305 is of dish shape having a circular bottom 305a with a central aperture 305b therein to receive the top end of bolt or rod 207, an upwardly and outwardly slanting vertical wall 305c with spaced apart draining apertures 305d therein, and a top annular horizontally extending flange 305e.

The fluid pressure supply to actaute the fluid pressure actuator 302 to reciprocate the first valve 206 and to seat and unseat the valve maens 206a and 206b at the bottom thereof will be described later.

Also formed in the combined gasket and pressure actuator generally indicated at 300 is a drain valve actuator portion 301 formed with an inverted U-shaped in cross section formed up annular biasing portion consisting of outer vertical wall 301a, top annular portion 301b and vertical inner wall 301c which at its bottom joins integrally with the disc-like bottom 301d. This pressure actuator portion is positioned above a drain cut-off valve pressure actuator chamber 212 to actuate a drain cut-off valve generally indicated at 213 as will be described.

In FIG. 7 first valve 206 is shown in its pressurized position where it has moved down so that the first valve means 206a thereon seats on seal 201c to close off passage 201″ from portion 201e of passage 201′. Passage 201e is opened to communicate with the drain passages 203 and 203a since the second valve means 206b on the first valve 206 has been moved down off of its cooperating seat 201d. Pressure besides acting on the pressure actuator 302 is acting on the top of the second valve means 206b and the portion centrally thereof to hold valve 206 down.

It is desired that there be no communication between the drain passageway 203 and the bottom portion of pressure actuator cylinder cavity 205 below the actuator 302 therein and thus there is provided a seal assembly about the sleeve 209, which includes an O-ring 204a and retainer washer 204b shown in FIGS. 6, 7 and 8.

Still referring to FIG. 6 there is connected to the drain cavity 203 in the middle section 200b of the valve body a drain passageway 203a which leads to the bottom of a drain cut-off valve pressure actuator chamber 212 that extends vertically in the middle section 200b and receives the drain cut-off pressure actuator piston generally indicated at 213. The piston assembly 213 includes a reduced diameter rubber washer 214 which is suitably held assembled with the cut-off actuator 213 by means of a bolt and nut assembly generally indicated at 214a and which seats against the bottom of chamber 212 to close off the drain entry passageway 203a. A compression spring 215 is positioned in the bottom of the chamber 212 and seats around the member 214 against the bottom of actuator 213 and urges it upward.

Also shown in FIG. 6 is a vertically disposed screen-receiving cavity or well 216 which extends through the middle section 200b and has a lower opening 216a communicating with the hard water supply passageway second portion 201″. The screen-receiving passageway 216 receives a cylindrically shaped screen 217. The upper end of screen 217 extends into an internally threaded aperture 216b in upper section 200a. Threaded aperture 216b receives a special securing cap screw 217a that extends at its reduced lower end into the top of screen 216. A sealing washer 217b seals cap 217a in section 200a. Control pressure water and bypass water, as will be explained later, passes through this screen 217 and passes through the cavity connected therewith, an indicated at 216c in FIG. 4 in the middle section 200b of the valve body.

Figure 3:
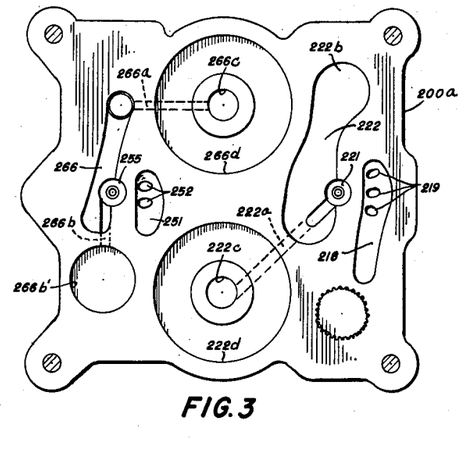
FIG. 3 is a bottom view of the top section of the body of the valve assembly along line 3—3 of FIG. 2.
Figure 4:
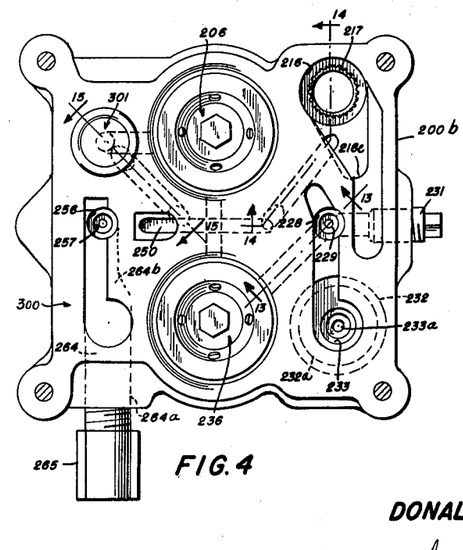
FIG. 4 is a top view of the mid-section of the body of the valve assembly along line 4—4 of FIG. 2 with the gasket in place.
Figure 5:
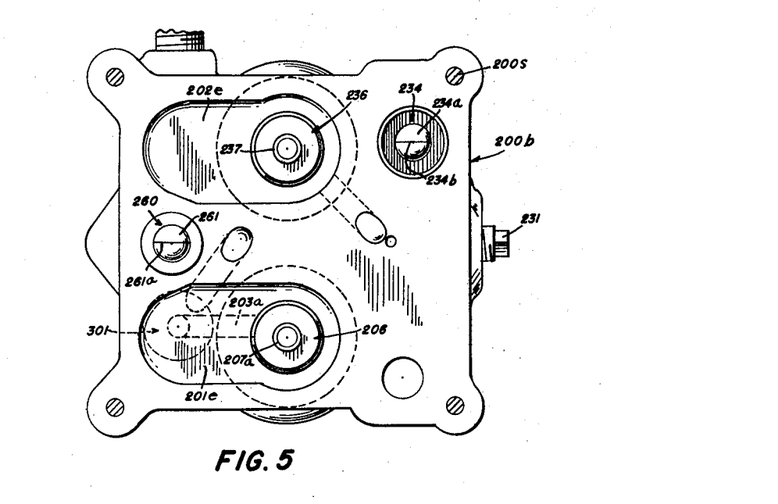
FIG. 5 is a bottom view of the mid-section of the body of the valve assembly along line 5—5 of FIG. 2.
Figure 10:
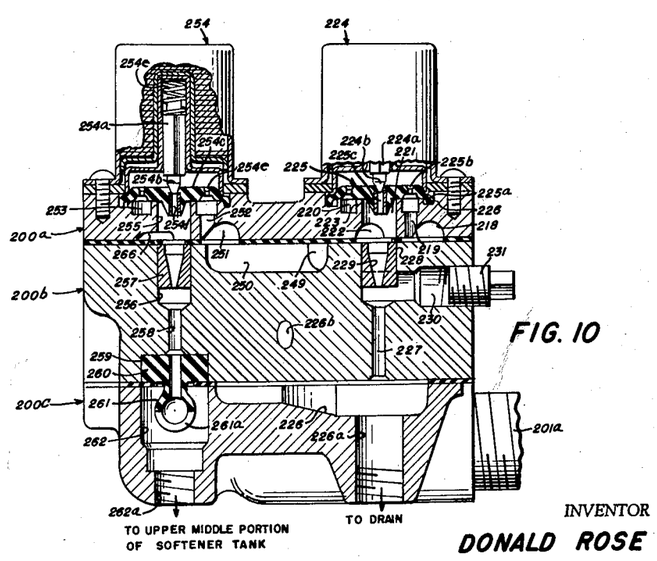
FIG. 10 is a vertical section view along line 10—10 of FIG. 1.

Referring to FIG. 3 a first control pressure channel way comprises the channel way 218 formed in the bottom of the top section 200a which is generally oval and elongated in shape and extends over to and above an end part of the cavity 216c middle section 200b, see FIG. 4, to receive water therefrom and conduct it through the three vertical channel ways 219 as shown in FIG. 3 and one in section in FIG. 10 at 219 to an annular open face cavity 220 in the top of valve body 200a, thence to the coaxial passageway 221 within annular cavity 220 in the top section 200a. Vertical passage 221 is in communication with the balance of the first control pressure channel way 220, as indicated in FIGS. 3, 6 and 10. It will be noted in FIGS. 3 and 10 that an elongated shallow cavity or channel way is formed in the lower face of the top section 200a and it receives fluid pressure from vertical passage 221 with which its outer edge portion is in communication. Also in FIG. 3, a passage 222a is drilled or formed in the top section 200a to connect cavity 222 and 221 with a cylindrical recess 222c in top section 200a to feed fluid control pressure to the top of first valve element pressure cavity 205 and to the annular cavity 222d formed in 200a concentric about recess 222c to feed pressure to the first valve element 206 and the pressure actuator 302 of the combined gasket and pressure actuator 300.

The annular cavity 220, see FIG. 10, and the coaxial inner cylindrical vertical passage 221 are separated by an annular wall 223, the top of which forms a seat to receive a standard type of solenoid valve generally indicated at 224. The solenoid valve 224 has an armature 224a therein with a needle-like valve point 224b which seats in the center of a composition diaphragm generally indicated at 225 having a depending rim portion 225a received within an annular recess 226 in section 200a. The diaphragm 225 has spaced apart vertically extending small apertures 225b extending through the rim thereof so water under pressure may pass upward therethrough from the annular cavity 220 to the top of the diaphragm 225 to pressurize the top and hold it seated on the annular seat 223 when the needle valve 224b is seated to close off the orifice 225c which extends axially through the center of the diaphragm 225. Thus, when the solenoid 224 is energized to lift the armature 224a, the needle-like valve point 224b is lifted and orifice 225c is opened so that the pressure is reduced above the diaphragm 225 to upset the prior pressure balance above and below and the diaphragm 225 is lifted up by the pressure differential acting in annular cavity 220 therebelow and water under pressure flows over the valve seat 223 into the coaxial inner passageway 221 and thence to the cavity 222.

Figure 9:
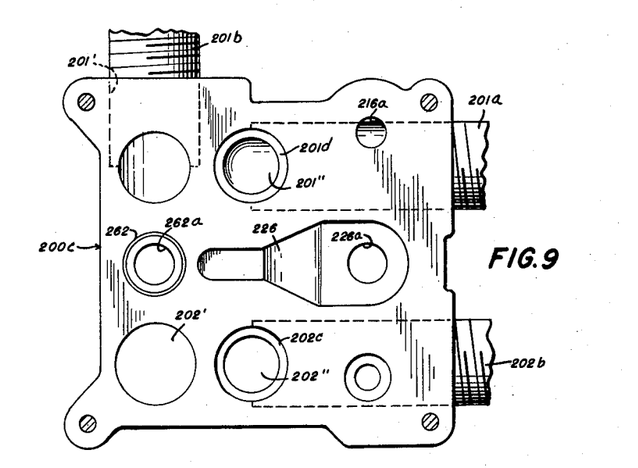
FIG. 9 is a top plan view of the bottom section along line 9—9 of FIG. 2.
Figure 15:
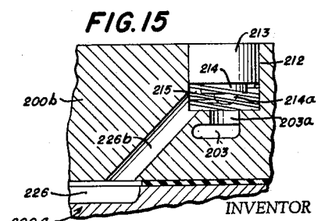
FIG. 15 is an enlarged vertical sectional view along line 15—15 of FIG. 4 showing the drain cutoff valve adjacent the first valve element and certain drain passageways.

Referring to FIG. 10, a common drain cavity is indicated at 226 in the bottom section 200c of the valve body and this cavity leads at one end to a vertical drain connection 226a to which a drain line may be attached. This drain cavity 226 is also shown in FIG. 9 which is a top plan view of the lower section 200c. In line with this drain cavity and the drain connection 226a therein, is a vertical passageway 227 leading to a jet cavity 228 thereabove which communicates with the passageways 221 and 222 and is axially in line and below the orifice 225c controlled by the solenoid valve 224. Housed in the orifice cavity 228 is a restricting jet orifice 229. A passageway or bore extends transversely to the passageway 228 and communicates therewith as indicated at 230 in the body 200b and receives a threaded plug 231. A secondary suction drain line may be attached to the aperture 230 when the threaded plug 231 is removed. When the solenoid valve 224, the first control valve means, is actuated by the control apparatus and jet 229 is placed in operation it directs a stream through the drains 226 and 226a in alignment therewith and places a suction on the common drain cavity 226 and all of the other drains to be described that are connected thereto. The pressurizing jet 229 also pressurizes the channel ways thereabove so as to apply pressure to the first valve element pressure actuator 302 to move the first valve element 206 down against the built in biasing portion 302a, 302b, 302d and 302e thereof, so that the first valved means thereon 206a seats against the seat 201c in the pressure supply passageway to close off the water supply and to interrupt the normal service operation of the valve assembly. In so doing, the second valve 206b unseats from its seat 201d to connect the section 201', the first section of the supply passageway 201, to the drain cavity 203 and drain passageway 203a. Reference to FIG. 15 shows the drain cut-off drain actuator 213 and the rubber valve element 214 associated therewith which closes off the drain passageway 203a in the bottom of the drain cavity 212. Connected to the drain cut-off valve pressure actuator cavity 212 in the valve body midportion 200b is a drain passageway 226b leading to the common drain cavity 226 in the bottom section 200c of the valve body. Thus, as will be described later when the cut-off drain actuator 213 is pressurized on top it moves down against the spring 215 and the rubber valve disk 214 seats against the bottom of the cavity 212 to close off the drain passage 203a so as to interrupt the drain connection from 203a through the cavity 212 to the drain passageway 226b and thence to the common drain 226.

Referring back to FIG. 3, it will be noted that one arm 222b of the portion of the first pressure control channel way 222 leads so as to be in position over a vertically extending first check valve cavity 232, see FIGS. 4 and 11, in the middle portion 200b of the valve body.

The vertically extending cavity 232 has a number of stepped bore portions therein as indicated at 232a, the largest diameter portion, a next portion 232b, the smallest diameter portion, and communicating therewith are two additional stepped larger portions 232c and 232d. A restrictor member generally indicated at 233 is mounted in the cavity 232a and has a throttling throat 233a therein which is axially above a check valve generally indicated at 234 mounted in the cavity portion 232d. Check valve 234 is of rubber and has a bulb portion 234a with a slit 234b across the bottom of the bulb portion which when pressure from the service line 202 and particularly the second portion 202" therebelow acts thereagainst closes the portions of the bulb 234a forming slit 234b and prevents flow upward therethrough. The check valve 234 is held in place by a retainer ring 235. This check valve 234 is a pressure controlling valve in a by-pass line formed by the passageway 222 and 222b leading from the pressure supply 201" shown in FIG. 6 and described above which provides a communication over to the service line portion 202". This by-pass provides backwash pressure under throttled pressure conditions which passes through the service line in reverse direction to the bottom of a softener tank (not shown). Check valve 234 and the by-pass in which it is positioned provides decreased pressure supply for the service line portion 202" and the house connection connected at 202b when the valve assembly is carrying out regeneration functions, including backwash and rinse. Thus, the service line portion 202" to supply water to the house is never without pressure.

Figure 12:
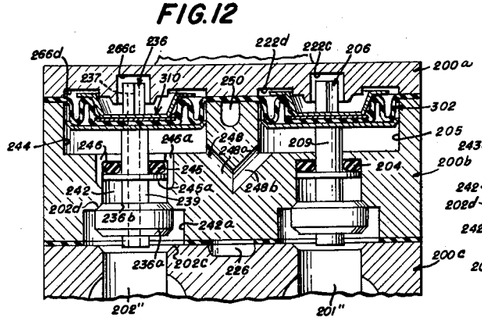
FIG. 12 is a fragmentary vertical cross section view along line 12—12 of FIG. 1 showing the two valve elements thereof and certain passageways.

Reference is now made to the service passageway 202 and the second valve element assembly 236 particularly shown in FIGS. 11 and 12. The second valve element assembly 236 is made up the same as the first valve element 206 having a bolt or stem 237 threaded at one end to receive a nut 238, a first valved means 236a which is of rubber or the like that seats against valve seat 202c and divides the service passageway 202 into a first portion 202' including the cavity 202e in the bottom of section 200b in the section 200c and a second portion 202". Also on the first valve element 236 is an oppositely positioned second valved means 236b and it seats against the seat 202d. Completing the second valve element 236 is a sleeve 239, a second valve pressure actuator 310.

The second valve element 236 is received within the middle section 200b of the main body in vertical cavities consisting of the drain cavity 242 above seat 202d and drain cavity 242a therebelow, a stem aperture 243 thereabove which receives and guides the sleeve 239 of the second valve element 236 and a third cavity consisting of the second valve element pressure actuator cavity 244. Received in the upper end of the drain cavity 242 is an O-ring 245 held in by a washer 245a therebelow and through which the sleeve 239 reciprocates. In FIG. 12 is shown two vertically extending spaced apart bores 246 and 246a extending in section 200b to form a communication from the bottom of the cavity 244 into the drain cavity 242. The built in biasing action in the combined gasket and pressure actuator 300 at the second pressure actuator 310 urges the second valve element 236 upward so as to close the second valved means 236b against the seat 202d. So also the pressure in lines 201" and 202" acts on the valves 206 and 236 at their bottom ends in service position to urge them up.

Figure 13:
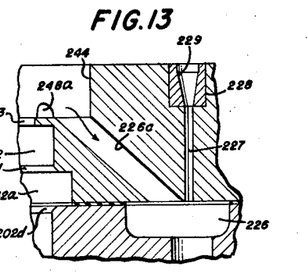
FIG. 13 is a vertical cross section view along line 13—13 of FIG. 4 on an enlarged scale showing a drain passageway to the second valve element.

Reference to FIGS. 11 and 13 shows a drain passageway 226c leading from the cavity 244 underneath the second valve element pressure actuator 310 to the common drain cavity 226.

Also in FIG. 12 there is shown an interconnecting passageway 248 which consists of two branches 248a and 248b which are bored downwardly at an angle of about 45° so as to meet and which interconnect the cavities 244 and 205 below the respective first and second valve element pressure actuators 302 and 310. This interconnecting passageway 248 drains off cavity 205 below the pressure actuator 302 therein to release any built-up pressure to the cavity 244 below the pressure actuator 310 that has the drain connection 226c as shown in FIG. 13.

Figure 14:
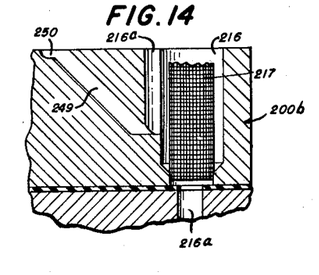
FIG. 14 is an enlarged vertical sectional view along line 14—14 of FIG. 4 showing a strainer in the supply line well and certain takeoff passages leading from the well.

Control pressure for actuating the second valve element 236 and the drain cut-off actuator 213 will now be described. Referring to FIG. 14 the pressure supply strainer well 216 and portion 216c thereof are connected by passageway 249 in the middle section of the valve body 200b with an elongated cavity 250 formed in the upper face of the middle section 200b as shown in FIGS. 4, 10 and 14. This cavity 250 extends across the valve body 200b, as shown best in FIG. 4, between the first and second valve elements generally indicated at 206 and 236. Reference to FIG. 3 depicting the top section 200a where the bottom face thereof is viewed shows a cavity 251 serving a similar purpose to that of cavity 218 and two vertical apertures 252 extend through the top section 200a shown in FIG. 10 in a similar manner to the apertures 219 for cavity 218. The upper ends of the apertures or bores 252 terminate in an annular cavity 253, see FIG. 10, similar to cavity 220 for the pressure actuator control valve 224. A solenoid actuated second control valve 254 like the valve 224 controls flow from the annular channel 253 to the vertical passage 255, the latter passage being similar to the passage 221 in the previously described valve arrangement operated by the solenoid 224. In the middle section 200b of the valve body and axially in line with the passageway 255 is a jet receiving aperture or well 256 within which is received a pressurizing jet 257. The base of the jet well 256 is connected by a vertical bore 258 with a cavity 259 in the bottom face of the middle section 200b to receive a check valve 260 similar to the check valve 234 previously described. This check valve 260 has a bulb portion 261 at its bottom end which is slotted at 261a in its lower half. The bulb portion 261 is received within the vertical aperture 262 extending in the bottom section 200c of the valve body which has a threaded lower end or outlet 262a that is connected with a softener tank (not shown) just above the mineral bed upper level.

Referring to FIG. 4, there is shown a side passageway 264 in the bottom section 200b of the valve body. This passage 264 has a threaded external end at 264a and a reduced throat portion 264b at the inner end which communicates with the bottom of the jet well 256 below the jet 257, as shown in FIG. 10. Connected at the outer end 264a of the passageway 264 is a fitting 265, see FIGS. 1 and 2, that is adapted to receive a rubber or plastic tube (not shown) which leads to a common brine suction and water replacement line in the brine tank (not shown).

It will be seen in FIG. 10 that the armature 254a in the solenoid actuated valve 254 has a needle valve end 254b cooperating with the orifice 254d in the diaphragm 254c of the valve assembly 254. A spring 254e urges the armature 254a and the needle valve 254b thereon into closing position with the orifice 254d in diaphragm 254c. The small vertically extending orifice 254e in the diaphragm 254c permits equalization of pressure above and below diaphragm when the orifice 254d is closed off by valve 254b. When the solenoid 254 is energized the armature 254a is retracted against the spring 254c and the pressure balance is upset about the diaphragm 254c so as to permit control water under pressure to travel from the channel 253 to the vertical passageway 255 and then to the jet 257 as will later be described.

Referring again to FIG. 3, there is shown a second control pressure channel way portion 266 similar to the first channel way portion 222. Channel way 266 is elongated and is in communication with the bottom end of the vertical passageway 255, see FIG. 10. One end of passageway 266 is connected by a channel way 266a drilled in top section 200a to communicate with an axially extending cavity 266c receiving the top end of the second valve element 236. A concentric cavity 266d in top section 200a is in communication with cavity 266c and receives pressure to pressurize the pressure actuator 310 of the second valve 236. The other end of the cavity 266 is connected by a drilled passage 266b to a cavity 266b' in top section 200a to supply pressure to the drain cut-off pressure actuator 213. The combined gasket and pressure actuator generally indicated at 300 has formed therein a drain cut-off valve pressure actuator portion generally indicated at 301 as previously described with reference to FIG. 8. This portion 301 of the gasket 300 applies pressure to the top of cut-off valve piston 213 when pressurized. The portion 301 has a built in biasing feature in the shaped portions 301a, 301b, 301c and 301d. Thus, the jet 256, when pressure is applied thereto, backs up pressure in the passageway 266 so as to apply control pressure to both the second valve element 236 and to the drain cut-off valve pressure actuator 213.

Operation of Valve Assembly

The operation of the valve assembly 200 is analogous to that as explained in my copending application Serial No. 707,267, filed January 6, 1958, now Patent No. 3,044,626.

Figure 1:
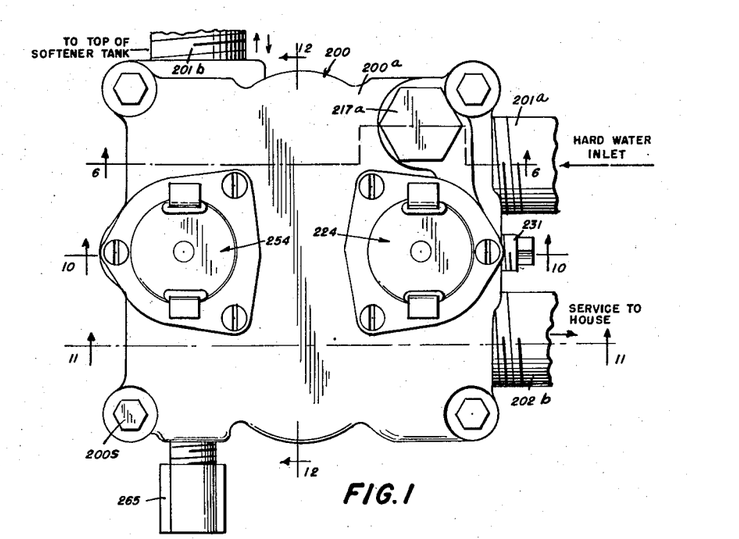
FIG. 1 is a top plan view of the valve assembly.

In the service or softening operation the hard water supply which is connected at 201a, as diagrammatically shown in FIGS. 1 and 6, passes through the service passageway 201, past the valve seat 201d, out through the chamber portion 201e and to the outlet connection 201b which is connected to the top of a softener tank (not shown). In the softener tank S, such as shown in my copending application Serial No. 707,267, filed January 6, 1958, water passes downward through the mineral bed M where treatment and softening takes place by the ion exchange principle out the bottom of the softener tank S and thence up to the valve assembly 200 where it enters at 202a into the service passageway 202, past the valve seat 202c and thence out to the house service connection 202b.

A timer mechanism and circuits as shown in my copending application Serial No. 707,267, filed January 6, 1958, now Patent No. 3,044,626, are utilized with this valve assembly 200 to properly actuate the solenoids 224 and 254 for the first valve element 206 and the second valve element 236, respectively. It will be noted that the valve elements 206 and 236 are biased upwardly as is the by-pass cut-off operator 213. In the case of the first valve element 206 and a second valve element 236 water pressure also acts on the first valved means 206a for the first valve element 206 and on the first valved means 236a on the second valve element 236. Spring 215 under cut-off valve piston 213 holds the valve washer 214 off of the bottom of well 212 so that the drain is open when the pressure actuator 301 therefor is not pressurized.

Backwashing

Backwashing is an upflow operation that loosens a mineral bed and removes foreign deposits on such mineral material in a softener tank. The first solenoid actuator 224 is energized and the armature 224a thereof is raised off its seat so as to apply the first control pressure which follows the path from the supply pressure line portion 201″, passage 216a, through screen 217, the screen well 216, the first control pressure channel way portion 218 in communication with the screen well 216 at 216c, through vertical passageways 219, annular passage 220, thence under the diaphragm 225 and into the vertical passageway 221, pressurizing the jet 229 and placing a suction on the common drain 226—226a. Pressure in the portions 222a and 222b of the first control pressure channel way 222 applies pressure to the first valve element 206 causing it to move down against the built in biasing action in the portion of the combined gasket and pressure actuator 300 so that the first valved means 206a thereon seats and closes against the seat 201c therebelow and interrupts supply passageway 201 and water flow therethrough. As the first valve element 206 moves downward, the second valve means 206b thereon unseats from its seat 201d and opens up the drain 203—203a to the topside of the softener tank as it is connected to passageway first portion 201′ and 201b. Water for backwashing comes from the first control passageway portion 222b that is also pressurized when solenoid 224 is actuated, passes down through the first check valve 234, through the service passageway 202 in the valve body and past the valve seat 202c and thence through passage 202c and 202a to the bottom of the softener tank. This by-pass water pressure is governed by the by-pass through the check valve 234 to supply adequate backwash up through a mineral bed in a softener tank.

Any pressure on a softener tank is relieved through the drain 203a which passes through the drain chamber 212 to the drain passage 226b and thence to the common drain 226. The action of the pressurizing jet 229 places a suction on the common drain 226 and thus assists in removing the backwash water. Since the pressure is applied on the drain to form a suction, the drain can be at a higher level than the valve assembly 200 and still move drain water out of the system.

In this operation of backwashing since there is pressure on the softener tank, pressure feeds up therethrough to connection 262a, see FIG. 10, in the valve body so as to apply pressure and close the slot 261a of bulb 261 of the check valve 260. This check valve 260 seals off any movement of water upward therethrough.

Brine and Slow Rinse

Following the backwash, a timer control mechanism adapted to be used with this valve assembly causes the second solenoid, namely, solenoid control valve means 254 to be energized. The first solenoid 224 is still energized. On energization of solenoid 254 the second control pressure channelway 266 is pressurized. The second control pressure channelway 266 receives a water pressure supply from the pressure supply line portion 201a, the screen well 216, passageway 249 in the valve body 200b, see FIG. 14, cavity 250, cavity 251, vertical passageways 252, annular cavity 253, the water then passes under the diaphragm of solenoid valve 254 and thence down through the passage 255 whereupon jet 257 is pressurized as is the second control passageway 266. The second control passageway 266 pressurizes each of its ends 266a and 266b so as to move the second valve element 236 downward and also move the drain cut-off actuator 213 down so that the rubber washer 214 thereon closes off the drain passage in the bottom of the drain well 212. When the second valve element 236 moves downward the first valved means 236a closes against seat 202c and shuts off any by-pass water and at the same time the second valve means 236b moves down in unison therewith to uncover its seat 202d and provide communication from the first portion of the service passageway 202' to the drain cavity 242. As viewed in FIG. 12, drain cavity 242 for the second valve 236 communicates through the vertical passages 246 to the bottom of the second valve pressure actuator cavity 244 and then by the drain 226c, see FIG. 13, to the common drain 226. This action starts a brine operation that is followed by a slow rinse operation. The pressurizing jet 257 places a suction on the line 264 in the valve body, see FIG. 4, which is attached to the fitting 265 and to the bottom of a brine tank such as shown in my copending application Serial No. 707,267, filed January 6, 1958, now Patent No. 3,044,626, leading to a common brine and replacement water line connected to the brine tank and to fitting 265 on the valve assembly 200, see FIGS. 2 and 4. Brine is drawn up from the bottom of the brine tank and is discharged through the passage 262a below jet orifice 257 and to the top of the bed of minerals in the softener tank. The drain water of the brining operation passes out the bottom of softener tank and through the connection 202a, see FIGS. 11 and 12, the first portion 202' of the service passageway 202, past the second valve means 236b on the second valve element 236, past seat 202d, through 242, apertures 246 and 246a, bottom of well 244, and out through the drain passage 226c, see FIG. 13, to the common drain 226. This common drain 226 is still being augmented by the pressurizing jet 229 so that the drain is given an ejector action through the connection 226a therebelow the orifice passageway 227 below the first jet orifice 229.

As the brine level in the brine tank drops, suitable controls (not shown here) shown in my copending application Serial No. 707,267, filed January 6, 1958, now Patent No. 3,044,626, causes the first solenoid 224 to be deenergized and the first valve element 206 to move to upward position. A suitable holding circuit (not shown) maintains the second solenoid 254 energized so that the second valve element 236 is still held in downward position and the service passageway 202 is still closed off by the first valved means 236a on the second valve element 236.

Fast Rinse

First valve element 206 is in the up position and second valve element is in down position. Pressure is now applied through the supply passageway 201 in the valve body, past the valve seat 201c and thence to the top of the softener tank. With this pressure applied at the top of the softener tank, a suitable connection to the tank leading to just above the mineral bed therein and to 262a is pressurized and the check valve 260 thus is pressurized closed so as to prevent water from passing upward therethrough. Pressure is still applied to the jet 256, and it now discharges through what previously acted as the brine suction line 264, through fitting 265, and thence to the brine tank so as to now act as a water replacement line to place water into the bottom of the brine tank. A suitable float circuit is provided so that when the replacement water reaches the proper level the control circuits to the solenoids are restored. As the full pressure supply from the supply line 201 is applied to the top of the softener tank, it provides a fast rinse through the mineral bed therein, which fast rinse is drained off through the drain provided by the second valve element 236 which leads to the drain line 226c to the common drain 226. Upon restoring the circuits to service condition of non-energization, the solenoid of the valve means 254 is deenergized, and the second valve means 236 returns to normal or service position whereupon the second valve means 236a thereon moves up off seat 202c restoring the communication between the first portion 202' and the second portion 202'' of the service passageway 202 whereupon soft water now being conditioned through passing through the mineral bed passes through the service line 202 to the house connection 202b.

It is to be noted that the slow rinse followed by the fast rinse provided by the flexibility of the valve assembly carries out of the rinsing of the minerals in a softener tank after they have been rehabilitated by the brine cycle in such a manner that the mineral bed is regenerated to handle and to also cope with iron-bearing waters.

The valve assembly 200, according to this invention as illustrated and described as to its operations uses only two solenoid actuated first and second valve elements each having first and second valve means thereon. There is a minimum of operating parts; nevertheless the appropriate upflow backwash is supplied for the minerals as prescribed by the mineral manufacturer; a slow brining which is a downflow operation under pressure controlled conditions is applied to the mineral bed; a slow rinse that is downflow and controlled under reduced pressure is maintained; and a fast rinse that is downflow under full pressure is provided.

The use of the combined gasket 300 and pressure actuator portions generally indicated at 302 for the first valve element 206, 310 for the second valve element 236 and 301 for the cut-off drain valve 214 provides for free action of the valves with no sticking of the pressure actuators. In this valve assembly the actuation of the first, second and drain cut-off valves is without differential pressure and thus positive and very reliable free action is assured with a minimum of wearing of parts and a freedom from leakage.

It is to be noted that the cross sectional size of apertures 246 and 246a, see FIG. 12, bears a ratio to the cross sectional area of drain aperture 226c such that the pressure under the first pressure actuator 302 and the second pressure actuator 310 is equal to less than 60% of the main supply pressure during the fast rinse cycle.

When the second solenoid 254 is denergized the pressure on top of the first pressure actuator 302 has already been relieved and as soon as the second pressure actuator 310 moves up to seat 236b against seat 202d any pressure remaining under the first pressure actuator 302 in chamber 205 and under the second pressure actuator 310 in chamber 244 is relieved to drain passage 226c.

During the fast rinse when drain water pressure is in the chambers 205 and 244 below the pressure actuators therein, the top retainer or washer elements 305, as illustrated in FIG. 8, for the first and second pressure actuators 302 and 310 receives the force of the pressure therebelow and contains the diaphragm portion of the pressure actuators and prevents them from blowing out.

While solenoid actuated valves have been illustrated to supply the control pressure to the valve actuators manual or mechanical valves can be used to supply the control pressure. So also electric or mechanically operated cams can be used to move the first and second valve elements 206 and 236.

This valve assembly may equally as well be used with pressure brining systems or in a non-pressure sealed brine tank system in water softener apparatus. Without adjustment the valve assembly will work on pressures ranging from about 2 to 200 pounds per square inch and due to this it can take advantage of all water systems. In use of this valve assembly the pressure controls the rates of flow and volume.

In the fast rinse cycle of operation provided by this valve assembly there is a large volume of water that drains through the mineral bed that eliminates or renders dormant the salt and iron pockets which do not back wash out or do not exchange by the brine action and thus there is no passing of a slug of iron into the house supply after regeneration. The fast rinse action packs the mineral bed for better filtration of a turbid water supply. The fast rinse accorded by this valve assembly permits the water pressure to govern the volume and velocity of water passing through the mineral bed so as to condition the mineral to optimum form.

I claim as my invention:

1. In a valve assembly having a body, a fluid passageway therein, a reciprocable valve for said passageway for opening and closing the same, a pressure actuator chamber in said body, a pressure actuator operable in said actuator chamber and connected with said valve for actuating same, said pressure actuator comprising a sheet of resilient flexible material having a gasket portion surrounding a centrally positioned pressure actuator portion connected to said valve, said pressure actuator portion having at least one annular U-shaped in cross section portion positioned in the pressure actuator chamber and intermediate the surrounding gasket portion and a center disc portion whereby the U-shaped in cross section annular portion provides a biasing force on pressure being applied thereto that deforms the same causing the pressure actuator to resume its normal position on release of actuating pressure applied thereto to move said valve, said body having an aperture at the bottom of said actuator chamber to receive and guide a stem connecting said valve and the pressure actuator, a rigid central apertured disc attached to said valve stem and to the center disc portion of the flexible and resilient pressure actuator, a bottom rigid central apertured disc recceived over said stem and abutting one side of said pressure actuator and having an upturned annular rim nesting said U-shaped in cross section annular portion of the pressure actuator and a top rigid central apertured washer member received over said stem and abutting said center rigid disc and the center disc portion of the flexible pressure actuator, said washer receiving actuating pressure for the actuator thereagainst its exposed outer face and having an annular upturned outer portion with an outer annular flange projecting over at least a portion of said U-shaped in cross section annular portion to prevent a fluid actuating medium from acting directly on said U-shaped in cross section annular portion of the pressure actuator thereby permitting it to flex normally without being distorted by action of fluid pressure directly thereagainst.

2. In a valve assembly according to claim 1 wherein said rigid bottom disc and rigid top washer have spaced apart drain apertures extending therethrough from one face to the other face of the respective disc and washer.

3. A fluid pressure actuator for reciprocally moving an element comprising in combination a body having a pressure actuator chamber, a pressure actuator operable in said actuator chamber, an element connected with said actuator to be reciprocally moved thereby, said pressure actuator comprising a sheet of resilient flexible material having a gasket portion surrounding a centrally positioned pressure actuator portion connected to said element, said pressure actuator portion having at least one annular U-shaped in cross section portion positioned in the pressure actuator chamber and intermediate the surrounding gasket portion and a center disc portion having reinforcing means whereby the U-shaped in cross section annular portion provides a biasing force on fluid pressure being applied thereto that deforms the same to move the pressure actuator and the connected element linearly in one direction and said biasing force on release of said pressure causes the pressure actuator and its connected element to move in the reverse direction and to resume its normal condition and position, said body having an aperture at the bottom of said actuator chamber to receive and guide therethrough said element connected to said centrally positioned pressure actuator portion, and a rigid centrally apertured disc attached to said element and to the centrally positioned disc portion of the flexible and resilient pressure actuator, a bottom rigid centrally apertured disc-like piston received over said element and abutting one side of said pressure actuator portion and having upturned rims thereon nesting said U-shaped in cross section annular portion of the pressure actuator and a top rigid centrally apertured washer member received over said element and abutting center disc portion of the flexible pressure actuator and its reinforcing means, said washer receiving actuating pressure for the actuator thereagainst its exposed outer face and having an annular upturned outer portion with an outer annular flange projecting over at least a portion of said U-shaped in cross section annular portion to prevent a fluid actuating medium from acting directly on said U-shaped in cross section annular portion of the pressure actuator thereby permitting it to flex normally without being distorted by action of fluid pressure directly thereagainst.

4. A fluid pressure actuator for reciprocally moving an element according to claim 3 wherein said reinforcing means for the center disc portion of the flexible pressure actuator comprises a circular rigid washer member imbedded within said center disc portion of the flexible pressure actuator.

5. In a valve assembly having a body, a fluid passageway therein, a reciprocable valve for said passageway for opening and closing the same, a pressure actuator chamber in said body, a pressure actuator operable in said actuator chamber and connected with said valve for actuating same, said pressure actuator comprising a sheet of resilient flexible material having a gasket portion surrounding a centrally positioned pressure actuator portion connected to said valve, said pressure actuator portion having at least one annular U-shaped in cross section portion positioned in the pressure actuator chamber and intermediate the surrounding gasket portion and a center disc portion whereby the U-shaped in cross section annular portion provides a biasing force on pressure actuator to resume its normal position on release of actuating pressure applied thereto to move said valve, said body having an aperture at the bottom of said actuator chamber to receive and guide a stem connecting said valve and the pressure actuator, a rigid central apertured disc attached to said valve stem and to the center disc portion of the flexible and resilient pressure actuator and a top rigid central apertured washer member received over said stem and abutting said center rigid disc and the center disc portion of the flexible pressure actuator, said washer receiving actuating pressure for the actuator thereagainst its exposed outer face and having an annular upturned outer portion with an outer annular flange projecting over at least a portion of said U-shaped in cross section annular portion to prevent a fluid actuating medium from acting directly on said U-shaped in cross section annular portion of the pressure actuator thereby permitting it to flex normally without being distorted by action of fluid pressure directly thereagainst.

6. In a valve assembly according to claim 5 wherein said rigid top washer has spaced apart drain apertures therethrough from one face to the other face thereof.

References Cited in the file of this patent

UNITED STATES PATENTS

| | | |
|---|---|---|
| 1,363,470 | Knudsen | Dec. 28, 1920 |
| 1,743,127 | Fuller | Jan. 14, 1930 |
| 2,111,168 | Chansor | Mar. 15, 1938 |
| 2,160,757 | Schulhoff | May 30, 1939 |
| 2,982,304 | Bauerlein | May 2, 1961 |

FOREIGN PATENTS

| | | |
|---|---|---|
| 434,665 | Great Britain | Sept. 6, 1935 |
| 466,603 | Canada | July 11, 1950 |
| 697,658 | Germany | Oct. 18, 1940 |